Sept. 16, 1969　　　R. G. GREULICH　　　3,467,041

FEED MECHANISMS FOR SEWING MACHINES

Filed April 17, 1967　　　　　　　　　　　5 Sheets-Sheet 1

INVENTOR.
Robert G. Greulich

Witness

BY

Rosalind Tsai

Marshall J. Breen
ATTORNEY

Sept. 16, 1969    R. G. GREULICH    3,467,041
FEED MECHANISMS FOR SEWING MACHINES
Filed April 17, 1967    5 Sheets-Sheet 2

INVENTOR.
Robert G. Greulich
BY
Marshall J. Breen
ATTORNEY

Witness
Rosalind Tsai

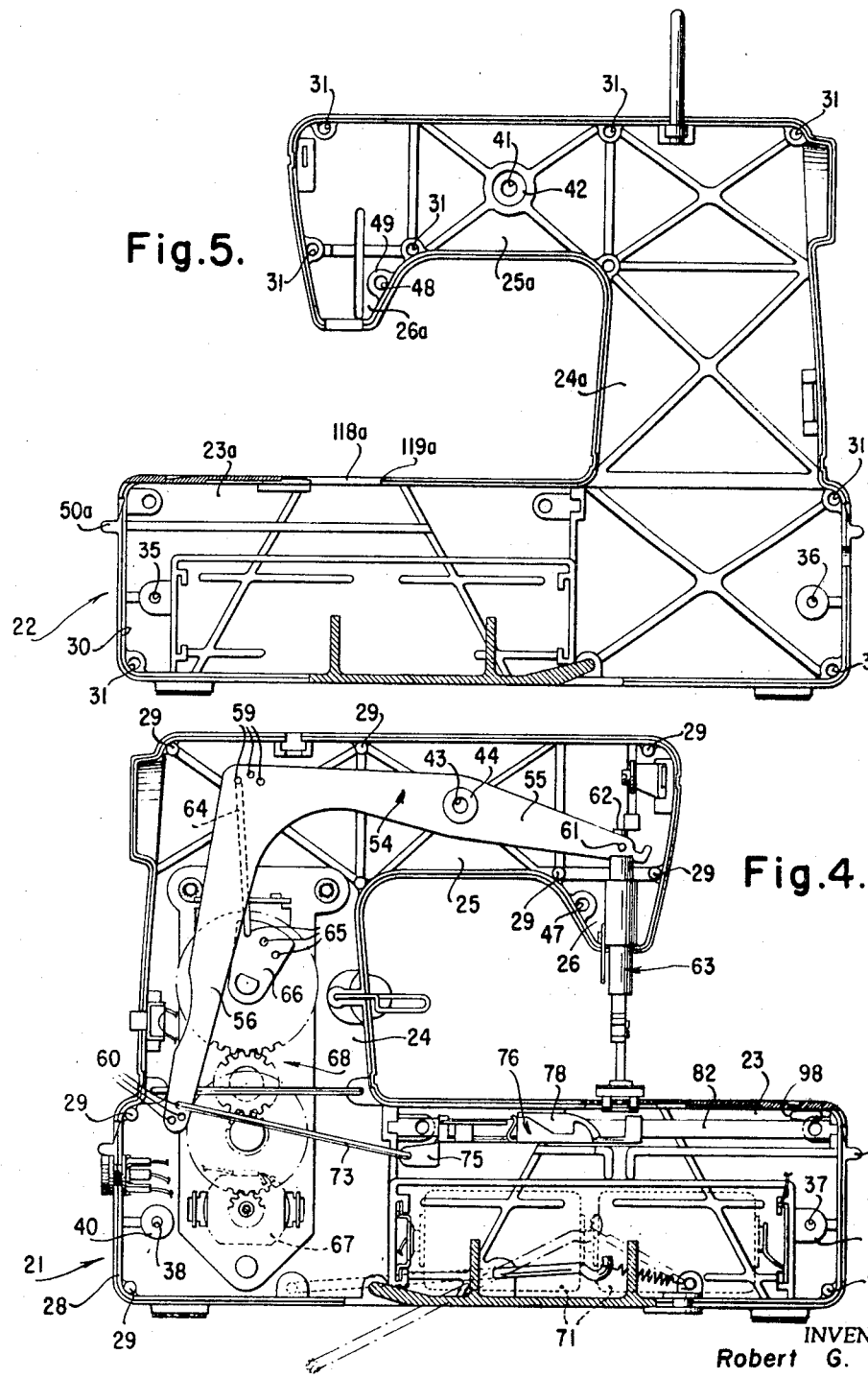

INVENTOR.
Robert G. Greulich

Sept. 16, 1969     R. G. GREULICH     3,467,041
FEED MECHANISMS FOR SEWING MACHINES
Filed April 17, 1967     5 Sheets-Sheet 5
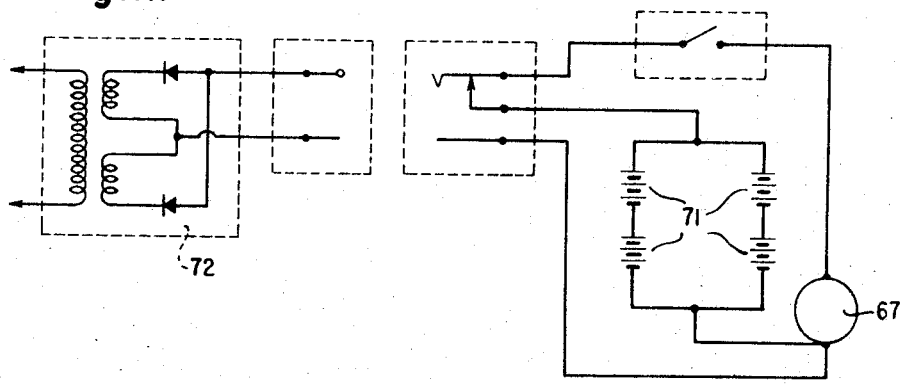
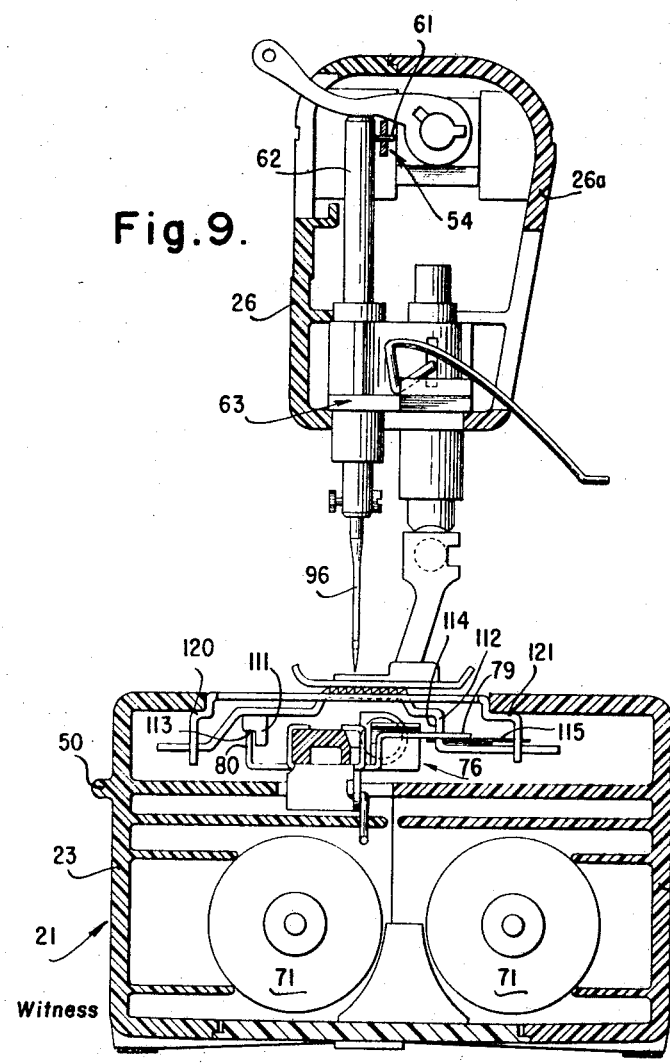
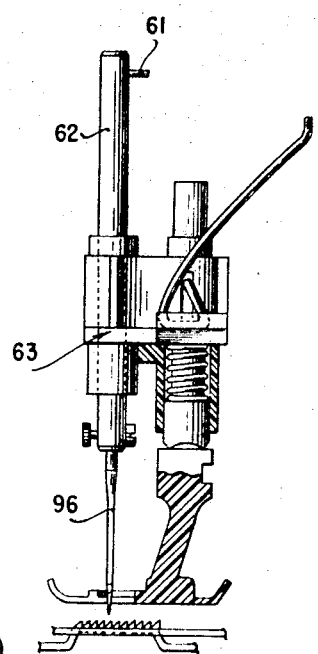
INVENTOR.
Robert G. Greulich
BY
ATTORNEY

United States Patent Office

3,467,041
Patented Sept. 16, 1969

---

3,467,041
FEED MECHANISMS FOR SEWING MACHINES
Robert G. Greulich, Belleville, N.J., assignor to The Singer Company, New York, N.Y., a corporation of New Jersey
Filed Apr. 17, 1967, Ser. No. 631,339
Int. Cl. D05b 27/00
U.S. Cl. 112—215         5 Claims

ABSTRACT OF THE DISCLOSURE

A feed dog wholly mounted on a throat plate. Feed lift and feed advance motions are imparted to the feed dog by cams on a reciprocating shuttle carrier for a long shuttle.

---

CROSS-REFERENCE TO RELATED APPLICATION

The needle bar and presser bar subassembly are more fully disclosed in a copending United States patent application Ser. No. 631,271, filed Apr. 17, 1967.

BACKGROUND OF THE INVENTION

Field of the invention

The invention relates to four motion feeding and longitudinally reciprocating shuttles.

Description of the prior art

Heretofore, feed dogs and throat plates have been separately mounted on sewing machine frames. Feed lift and feed advance motions have generally been imparted to the feed dogs by mechanisms deriving their motions either from rotating shafts or incline surfaces separately assembled within the frame. The foregoing constructions require numerous parts, precision machining, and painstaking assembly.

Summary of the invention

It is thereforer a primary object of the invention to provide an improved feed mechanism for sewing machines in which the feed dog is wholly mounted on the throat plate, and feed lift and feed advance motions are imparted to the feed dog by cams integral with the shuttle earlier deriving their motions from a long shuttle mechanism.

Other objects and a fuller understanding of the invention may be had by referring to the description and claims taken in conjunction with the accompanying drawings.

BRIEF DESCRIPTION OF THE DRAWINGS

FIG. 4 is an elevational view of the inside of the front shell of the frame of the sewing machine;

FIG. 5 is an elevational view of the inside of the rear shell of the frame of the sewing machine;

FIG. 9 is a cross sectional view through the sewing head of the sewing machine of FIG. 1 as viewed from the standard of the sewing machine;

FIG. 10 is a partially sectioned detail view of the needle bar and presser bar subassembly of FIG. 9 with the presser foot in raised position; and FIG. 11 is a wiring diagram for the sewing machine.

DESCRIPTION OF THE PREFERRED EMBODIMENT

Figure 1:
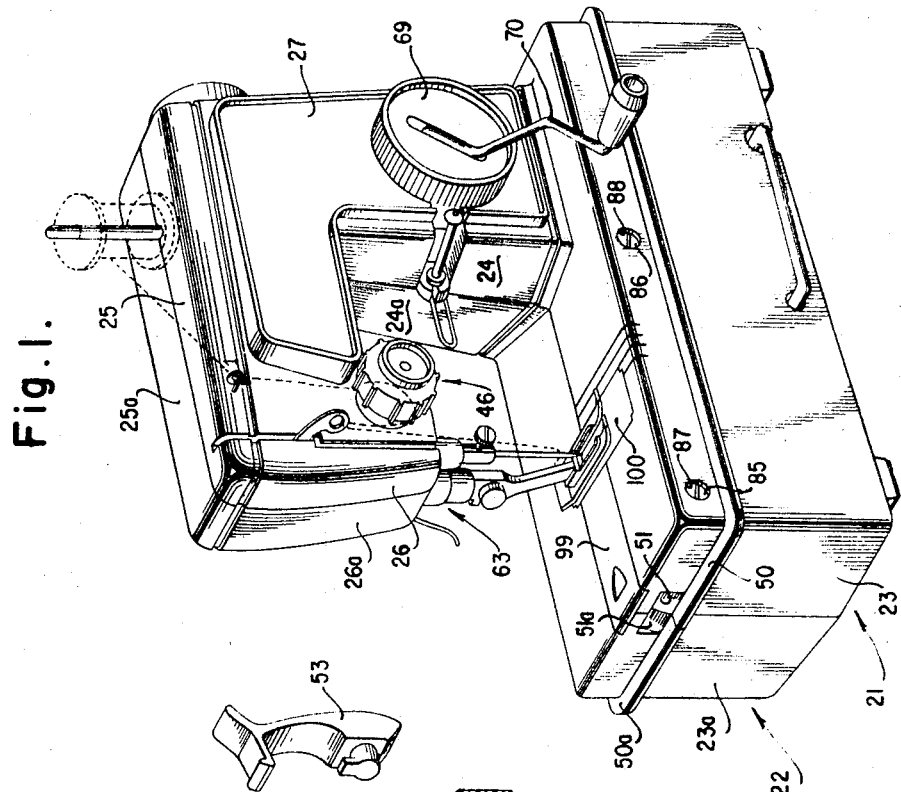
FIG. 1 is a front perspective view of a sewing machine incorporating the invention.
Figure 2:
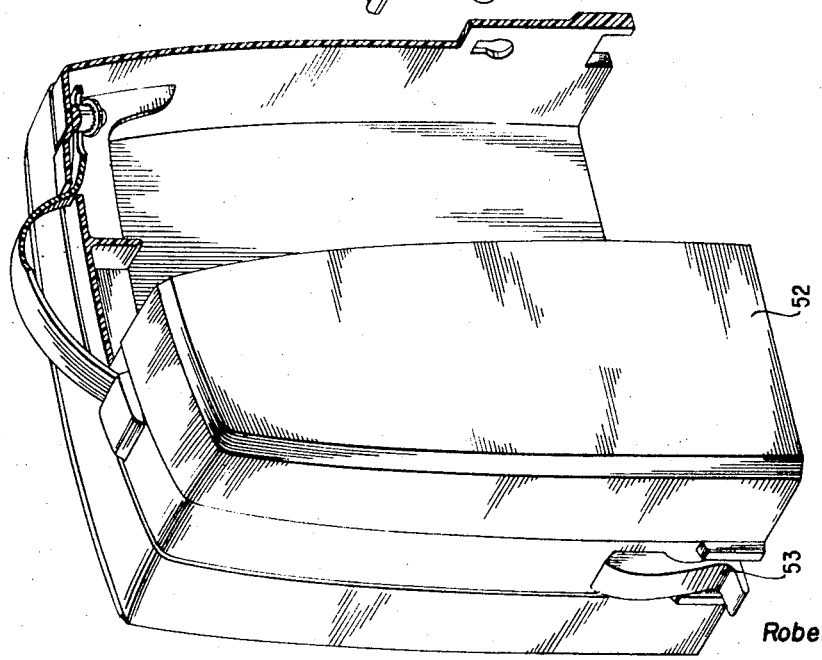
FIG. 2 is a partially sectioned, partially exploded front perspective view of the carrying case for the sewing machine.
Figure 3:
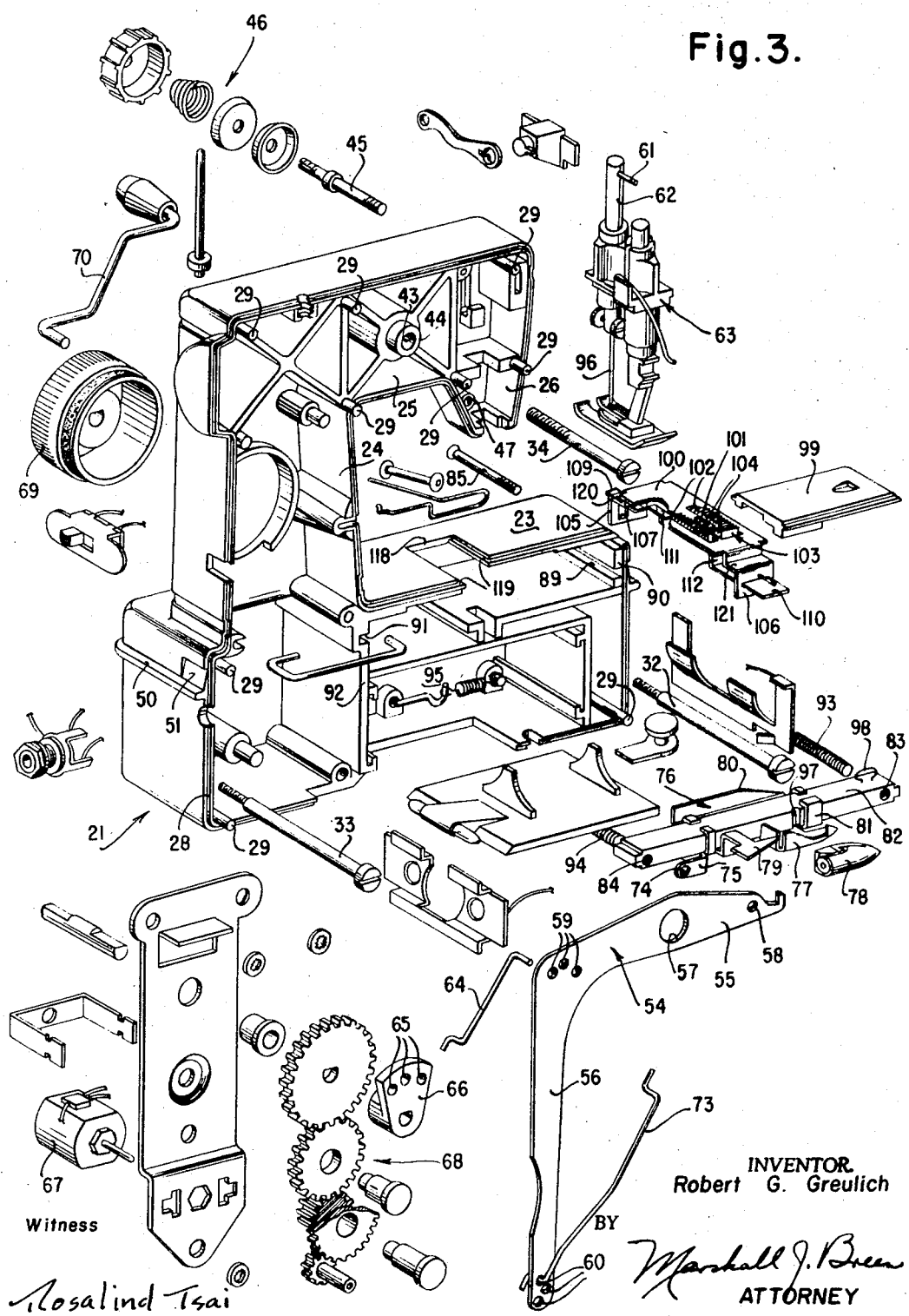
FIG. 3 is an exploded perspective view of the inside of the front shell of the frame of the sewing machine.
Figure 6:
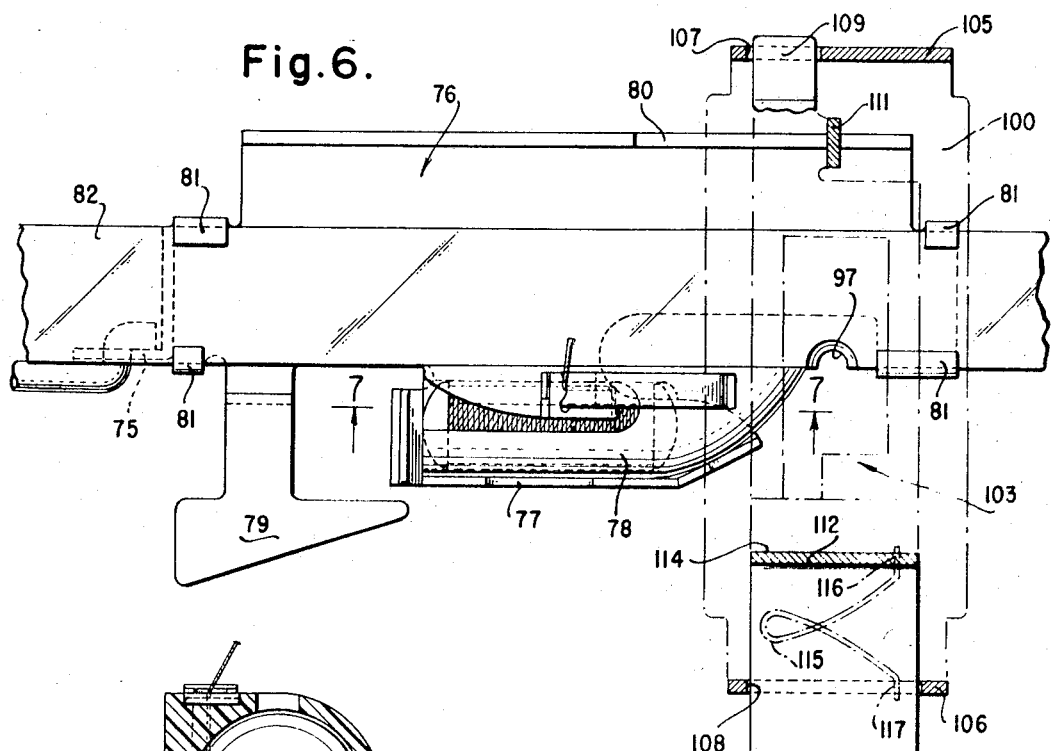
FIG. 6 is a top plan view of the shuttle carrier of the sewing machine.
Figure 8:
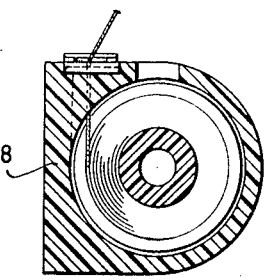
FIG. 8 is a cross sectional view taken substantially along line 8—8 in FIG. 7.
Figure 7:
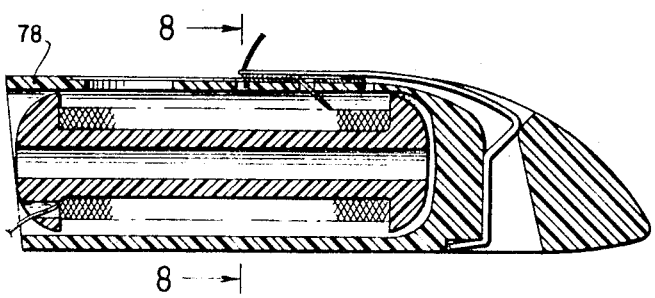
FIG. 7 is a cross sectional view taken substantially along the line 7—7 in FIG. 6.

With reference to the drawings, the invention is illustrated embodied in a sewing machine for children.

The sewing machine has a frame including a front shell 21 and a rear shell 22 each composed of plastic. Each shell has a bed portion 23 or 23a, a standard portion 24 or 24a rising from one end of the bed portion, an arm portion 25 or 25a at the top of the standard portion overhanging the bed portion, and a sewing head portion 26 or 26a at the free end of the arm portion. An L-shaped control panel 27 is formed on the arm and standard portions of the front shell.

The two shells register with each other through a peripheral flange 28 and bosses 29 formed in the front shell which mate with a peripheral groove 30 and holes 31 formed in the rear shell. The shells are held together by three screws 32, 33 and 34. Two of the screws extend through clearance holes 35 and 36 in the bed portion of the rear shell into tapped holes 37 and 38 in bosses 39 and 40 formed in the bed portion of the front shell. The remaining screw 34 extends through a clearance hole 41 in a boss 42 in the arm portion of the rear shell into a tapped hole 43 in a boss 44 formed in the arm portion of the front shell. Also holding the two shells together is an arbor 45 for a thread tension device indicated generally at 46. The arbor extends through a clearance hole 47 in the front shell into a tapped hole 48 in a boss 49 formed in the rear shell.

A flange 50 and 50a is formed around the periphery of the bed portions of the two shells, and recesses 51 and 51a are formed in the ends of the bed portions. A carrying case 52 having latches 53 can rest on the flange 50 and 50a with the latches seated in the recesses 51 and 51a in the bed portions.

Mounted in the arm and standard portions of the front shell is an L-shaped bell crank 54 having upper and lower arms 55 and 56. The bell crank has a hole 57 in the upper arm by which it is pivotally mounted on the boss 44 for one of the screws which hold the two shells together. The bell crank also has a small hole 58 in the free end portion of the upper arm, a group of three small holes 59 in the juncture of the upper and lower arms, and a group of three small holes 60 in the free end portion of the lower arm.

Seated in the small hole 58 in the free end portion of the upper arm is a crank pin 61 for a needle bar 62. The needle bar is part of a needle bar and presser bar subassembly 63 which is more fully described in the previously cited copending United States patent application.

A link 64 is pivotally mounted in one of the three small holes 59 in the juncture of the upper and lower arms. The other end of the link 64 is pivotally mounted in one of three small holes 65 in a crank 66. Groups of three small holes are used to provide an adjustment feature. Rotating motion is imparted to the crank 66 by an electric motor 67 through a gear train indicated generally at 68 or, in the alternative, by a coaxial handwheel 69 which can be manually rotated by a hand crank 70. The hand crank is removable to provide clearance for the carrying case. The electric motor is powered by batteries 71 or, in the alternative, by house current through an A.C. adapter 72 which steps down the voltage and converts the house current to direct current. Rotation of the crank 66 transmits oscillating motion to the bell crank 54 through the link 64.

A second link 73 is pivoally mounted in one of the three small holes 60 in the free end portion of the lower arm. The other end of the second link is pivotally mounted in a small hole 74 in an ear 75 on a shuttle carrier 76.

The shuttle carrier includes a holder 77 for a long shuttle 78, a wedge-shaped feed lift cam 80, a wedge-shaped feed advance cam 79, and four tabs 81 which slidably embrace a shuttle track 82 to mount the shuttle carrier on the shuttle track. The shuttle carrier, the ear 75 on the shuttle carrier, the holder for the shuttle, the feed lift and feed advance cams, and the four tabs for slidably mounting the shuttle carrier on the shuttle track can be integrally formed from a single sheet of metal.

The shuttle track has a tapped hole 83 and 84 at each end for two screws 85 and 86 which extend through clearance holes 87 and 88 in the front shell of the frame. The ends of the shuttle track are held in a groove 89 formed in a boss 90 at the sewing head end and in a groove 91 formed in a vertical partition 92 in the bed portion of the front shell. Coil springs 93 and 94 are mounted on the screws 85 and 86 to bias the shuttle track away from the front wall 95 of the front shell. To adjust the position of the shuttle relative to a needle 96 carried by the needle bar 62, the lateral position of the shuttle track in the grooves 89 and 91 can be adjusted by simply turning the screws 85 and 86 with a screwdriver. A notch 97 in the side of the shuttle track provides clearance for the needle, and a spring 98 on the shuttle track frictionally engages a slide plate 99 slidably mounted between the two shells of the frame to hold the slide plate selectively in a closed or an open position.

Mounted on a throat plate 100 having a needle aperture 101 and feed slots 102 is a feed dog 103 having feed teeth 104. The throat plate has a downwardly projecting tab 105 or 106 at each end with a slot 107 or 108 in each tab and the feed dog has an outwardly projecting tab 109 or 110 at each end which seat in the slots 107 and 108 in the tabs on the throat plate. The feed dog also has two downwardly projecting portions 111 and 112. One of the downwardly projecting portions 111 has a bearing surface 113 on the bottom which mates with the feed lift cam 80 on the shuttle carrier. The other downwardly projecting portion 112 has a bearing surface 114 on the side which mates with the feed advance cam 79 on the shuttle carrier. A spring 115 seats in a small hole 116 in the rearmost tab 106 on the throat plate and in a small hole 117 in the rearmost downwardly projecting portion 112 on the feed dog to impart feed return motion to the feed dog.

The throat plate and feed dog subassembly is mounted in rectangular holes 118 and 118a formed in the tops of the bed portions of the two shells of the frame. The rectangular holes have ledges 119 and 119a which support the throat plate, and the throat plate has a step portion 120 or 121 formed at each end which underlie the tops of the bed portions of the two shells of the frame to lock the throat plate and feed dog subassembly on the frame when the two shells are connected together.

The throat plate, the downwardly projecting tabs 105 and 106 at each end of the throat plate, and the step portions 120 and 121 formed at each end of the throat plate, as in the case of the shuttle carrier 76, can be integrally formed from a single sheet of metal. The feed dog, the feed teeth on the feed dog, the outwardly projecting tabs 109 and 110 at each end of the feed dog, and the two downwardly projecting portions 111 and 112 on the feed dog can also be integrally formed from a single sheet of metal.

In operation, oscillating motion of the bell crank 54 imparts reciprocating motion to the shuttle carrier 76 through the second link 73 in timed relation with reciprocation of the needle bar 62 to form stitches. As the shuttle carrier reciprocates, the cams 80 and 79 contact the feed dog in seriatim. The feed lift cam 80 imparts feed lift motion to the feed dog 103 through surface 113 and when the feed teeth are above the level of the top surface of the throat plate the cam 79 contacts the bearing surface 114 to impart feed advance motion to the feed dog. Feed return motion is imparted to the feed dog by the spring 115 between the feed dog and the throat plate 100 after the feed advance cam 79 has been withdrawn. The feed dog is lowered as surface 113 bears against cam 80 by reason of gravity during return motion of the shuttle carrier. This process is cyclically repeated.

Although the invention has been described in its preferred form with a certain degree of particularity, it is understood that the present disclosure of the preferred form has been made by way of example and that numerous changes in the details of construction and the combination and arrangement of parts may be resorted to without departing from the spirit and the scope of the invention.

Having thus set forth the nature of the invention, what is claimed is:

1. A feed mechanism for a sewing machine having a frame, a needle bar for a needle mounted in the frame, means for imparting reciprocation to the needle bar, a shuttle track mounted in the frame, a shuttle carrier for a long shuttle mounted on the shuttle track, and means for imparting reciprocation to the shuttle carrier in timed relation with reciprocation of the needle bar to form stitches when a needle is carried by the needle bar and a shuttle is carried by the shuttle carrier, said feed mechanism comprising a throat plate having a needle aperture and feed slots, a feed dog having feed teeth, means for mounting the feed dog on the throat plate with the feed teeth aligned with the feed slots in the throat plate, means for mounting the throat plate on the frame, a feed lift cam integral with the shuttle carrier for cyclically raising the feed teeth of the feed dog above the level of the top surface of the throat plate, a feed advance cam integral with the shuttle carrier for imparting feed advance motion to the feed dog when the feed teeth are above the level of the top surface of the throat plate, and means for imparting feed return motion to the feed dog when the feed teeth are below the level of the top surface of the throat plate.

2. The sewing machine of claim 1 in which the frame of the sewing machine includes two shells, the means for mounting the throat plate on the frame are included in each shell, and the throat plate is mounted on one shell and nonremovably entrapped on the frame by the other shell.

3. The feed mechanism of claim 1 in which the means for mounting the feed dog on the throat plate includes a downwardly projecting tab at each end of the throat plate with a slot in each tab and an outwardly projecting tab at each end of the feed dog which seat in the slots in the throat plate tabs.

4. The feed mechanism of claim 3 in which the means for imparting feed return motion to the feed dog is a spring between the throat plate and the feed dog.

5. The feed mechanism of claim 3 in which the feed lift and feed advance cams on the shuttle carrier are wedge-shaped cams and the feed dog includes a first downwardly projecting portion extending out of the surface of the feed dog having a bearing surface on the bottom thereof which mates with the feed lift cam and a second downwardly projecting portion having a bearing surface on the side thereof which mates with the feed advance cam.

References Cited

UNITED STATES PATENTS

| | | | |
|---|---|---|---|
| 89,040 | 4/1869 | Guinness | 112—195 |
| 99,138 | 1/1870 | Bennor | 112—195 |
| 1,708,296 | 4/1929 | Greenwood | 112—258 |

RICHARD J. SCANLAN, Jr., Primary Examiner

U.S. Cl. X.R.

112—295